United States Patent
Fujimoto

(10) Patent No.: US 12,301,446 B2
(45) Date of Patent: May 13, 2025

(54) COMMUNICATION DEVICE, COMMUNICATION SYSTEM, COMMUNICATION METHOD, AND NON-TRANSITORY COMPUTER READABLE MEDIUM STORING COMMUNICATION PROGRAM

(71) Applicant: NEC Corporation, Tokyo (JP)

(72) Inventor: Go Fujimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 449 days.

(21) Appl. No.: 17/637,153

(22) PCT Filed: Dec. 26, 2019

(86) PCT No.: PCT/JP2019/051227
§ 371 (c)(1),
(2) Date: Feb. 22, 2022

(87) PCT Pub. No.: WO2021/130985
PCT Pub. Date: Jul. 1, 2021

(65) Prior Publication Data
US 2022/0286385 A1    Sep. 8, 2022

(51) Int. Cl.
*H04L 45/24*    (2022.01)
*H04L 12/46*    (2006.01)
(Continued)

(52) U.S. Cl.
CPC .......... *H04L 45/24* (2013.01); *H04L 12/4633* (2013.01); *H04L 45/22* (2013.01); *H04W 80/02* (2013.01); *H04W 84/12* (2013.01)

(58) Field of Classification Search
None
See application file for complete search history.

(56) References Cited

U.S. PATENT DOCUMENTS 10,003,569 B2 * 6/2018 Janakiraman ......... H04L 12/462
10,820,202 B1 * 10/2020 Gundavelli ......... H04W 12/069
(Continued)

FOREIGN PATENT DOCUMENTS

| JP | 2005-318395 A | 11/2005 |
| JP | 2007-174120 A | 7/2007 |

(Continued)

OTHER PUBLICATIONS

Extended European Search Report for EP Application No. EP19957347.8 dated on Jul. 20, 2022.
(Continued)

*Primary Examiner* — Andre Tacdiran
(74) *Attorney, Agent, or Firm* — Sughrue Mion, PLLC

(57) ABSTRACT

A communication device (10) includes a wireless LAN interface (11) that wirelessly communicates with an access point (31), a wireless LAN interface (12) that wirelessly communicates with an access point (32), an encapsulation unit (13) that encapsulates, in accordance with a specified encapsulation protocol, a transmission frame to be transmitted to a communication device (20) at the other side via Layer 2 tunneling, and a redundancy unit (14) that generates a first encapsulated frame where a MAC address of the wireless LAN interface (11) is set to a source MAC address and a second encapsulated frame where a MAC address of the wireless LAN interface (12) is set to a source MAC address by using the encapsulated transmission frame.

13 Claims, 11 Drawing Sheets

(51) Int. Cl.
*H04L 45/00* (2022.01)
*H04W 80/02* (2009.01)
*H04W 84/12* (2009.01)

(56) References Cited

U.S. PATENT DOCUMENTS

| | | | | |
|---|---|---|---|---|
| 2004/0064581 A1* | 4/2004 | Shitama | ............... | H04W 36/18 |
| | | | | 709/218 |
| 2006/0215594 A1* | 9/2006 | Shirokura | ............... | H04L 45/24 |
| | | | | 370/328 |
| 2010/0046471 A1* | 2/2010 | Hattori | ................... | H04B 7/022 |
| | | | | 370/331 |
| 2010/0271937 A1* | 10/2010 | Durbin | ................... | H04L 45/04 |
| | | | | 370/225 |
| 2011/0271009 A1* | 11/2011 | Doshi | ............... | H04L 49/3009 |
| | | | | 709/242 |
| 2018/0338273 A1 | 11/2018 | Liu et al. | | |

FOREIGN PATENT DOCUMENTS

| | | |
|---|---|---|
| JP | 2007-209040 A | 8/2007 |
| JP | 2008-160495 A | 7/2008 |
| WO | 2008/099446 A1 | 8/2008 |

OTHER PUBLICATIONS

International Search Report for PCT Application No. PCT/JP2019/051227, mailed on Jan. 28, 2020.

* cited by examiner

COMMUNICATION DEVICE, COMMUNICATION SYSTEM, COMMUNICATION METHOD, AND NON-TRANSITORY COMPUTER READABLE MEDIUM STORING COMMUNICATION PROGRAM

This application is a National Stage Entry of PCT/JP2019/051227 filed on Dec. 26, 2019, the contents of all of which are incorporated herein by reference, in their entirety.

TECHNICAL FIELD

The present invention relates to a communication device, a communication system, a communication method, and a non-transitory computer readable medium storing a communication program.

BACKGROUND ART

Wireless communication such as a wireless LAN (Local Area Network) is widespread today and used in various systems at home, office, factory and the like. Use of wireless communication allows freely moving a communication device without limitation of wiring or the like. While this enhances convenience, it is desired to ensure the quality of communication including wireless communication.

Patent Literatures 1 and 2, for example, are known as the related art. According to Patent Literature 1, when transmitting a packet in a packet transfer device that performs communication through redundant paths in a wide area network or the like, the device makes a copy of the packet and assigns a sequence number indicating the sequential order to the packet, or uses GRE (Generic Routing Encapsulation) technology. According to Patent Literature 2, when a mobile IP system receives an encapsulated packet, it decapsulates the packet to check the sequence number and the arrival time.

CITATION LIST

Patent Literature

PTL1: Japanese Unexamined Patent Application Publication No. 2007-209040
PTL2: Japanese Unexamined Patent Application Publication No. 2008-160495

SUMMARY OF INVENTION

Technical Problem

The related art such as Patent Literatures 1 and 2 enhance the reliability of communication by performing communication through redundant paths.

However, since the related art do not give consideration to a system configuration in wireless communication, there is a problem that it is difficult to enhance the reliability of wireless communication in some cases.

To solve the above problem, an object of the present disclosure is to provide a communication device, a communication system, a communication method, and a non-transitory computer readable medium storing a communication program capable of enhancing the reliability of communication including wireless communication.

Solution to Problem

A communication device according to the present disclosure includes a first wireless LAN interface configured to wirelessly communicate with a first wireless LAN access point; a second wireless LAN interface configured to wirelessly communicate with a second wireless LAN access point; an encapsulation means for encapsulating, in accordance with a specified encapsulation protocol, a transmission frame to be transmitted to a communication device at other side via Layer 2 tunneling; and a redundancy means for generating a first encapsulated frame where a MAC address of the first wireless LAN interface is set to a source MAC address and a second encapsulated frame where a MAC address of the second wireless LAN interface is set to a source MAC address by using the encapsulated transmission frame, wherein the first wireless LAN interface wirelessly transmits the generated first encapsulated frame to the first wireless LAN access point, and the second wireless LAN interface wirelessly transmits the generated second encapsulated frame to the second wireless LAN access point.

A communication system according to the present disclosure includes first and second communication devices, and first and second wireless LAN access points connected to the second communication device, wherein the first communication device includes a first wireless LAN interface configured to wirelessly communicate with the first wireless LAN access point; a second wireless LAN interface configured to wirelessly communicate with the second wireless LAN access point; an encapsulation means for encapsulating, in accordance with a specified encapsulation protocol, a transmission frame to be transmitted to the second communication device via Layer 2 tunneling; and a redundancy means for generating a first encapsulated frame where a MAC address of the first wireless LAN interface is set to a source MAC address and a second encapsulated frame where a MAC address of the second wireless LAN interface is set to a source MAC address by using the encapsulated transmission frame, the first wireless LAN interface wirelessly transmits the generated first encapsulated frame to the first wireless LAN access point, and the second wireless LAN interface wirelessly transmits the generated second encapsulated frame to the second wireless LAN access point.

A communication method according to the present disclosure includes encapsulating, in accordance with a specified encapsulation protocol, a transmission frame to be transmitted to a communication device at other side via Layer 2 tunneling; generating a first encapsulated frame where a MAC address of a first wireless LAN interface is set to a source MAC address and a second encapsulated frame where a MAC address of a second wireless LAN interface is set to a source MAC address by using the encapsulated transmission frame, the first wireless LAN interface being configured to wirelessly communicate with a first wireless LAN access point, and the second wireless LAN interface being configured to wirelessly communicate with a second wireless LAN access point; wirelessly transmitting the generated first encapsulated frame from the first wireless LAN interface to the first wireless LAN access point; and wirelessly transmitting the generated second encapsulated frame from the second wireless LAN interface to the second wireless LAN access point.

A non-transitory computer readable medium storing a communication program according to the present disclosure is a non-transitory computer readable medium storing a communication program causing a computer to execute a process including encapsulating, in accordance with a specified encapsulation protocol, a transmission frame to be transmitted to a communication device at other side via Layer 2 tunneling; generating a first encapsulated frame where a MAC address of a first wireless LAN interface is set to a source MAC address and a second encapsulated frame where a MAC address of a second wireless LAN interface is set to a source MAC address by using the encapsulated transmission frame, the first wireless LAN interface being configured to wirelessly communicate with a first wireless LAN access point, and the second wireless LAN interface being configured to wirelessly communicate with a second wireless LAN access point; wirelessly transmitting the generated first encapsulated frame from the first wireless LAN interface to the first wireless LAN access point; and wirelessly transmitting the generated second encapsulated frame from the second wireless LAN interface to the second wireless LAN access point.

Advantageous Effects of Invention

According to the present disclosure, there are provided a communication device, a communication system, a communication method, and a communication program capable of enhancing the reliability of communication including wireless communication.

DESCRIPTION OF EMBODIMENTS

Example embodiments will be described hereinafter with reference to the drawings. In the figures, the identical reference symbols denote identical structural elements and the redundant explanation thereof is omitted.

Overview of Example Embodiment

Figure 1:
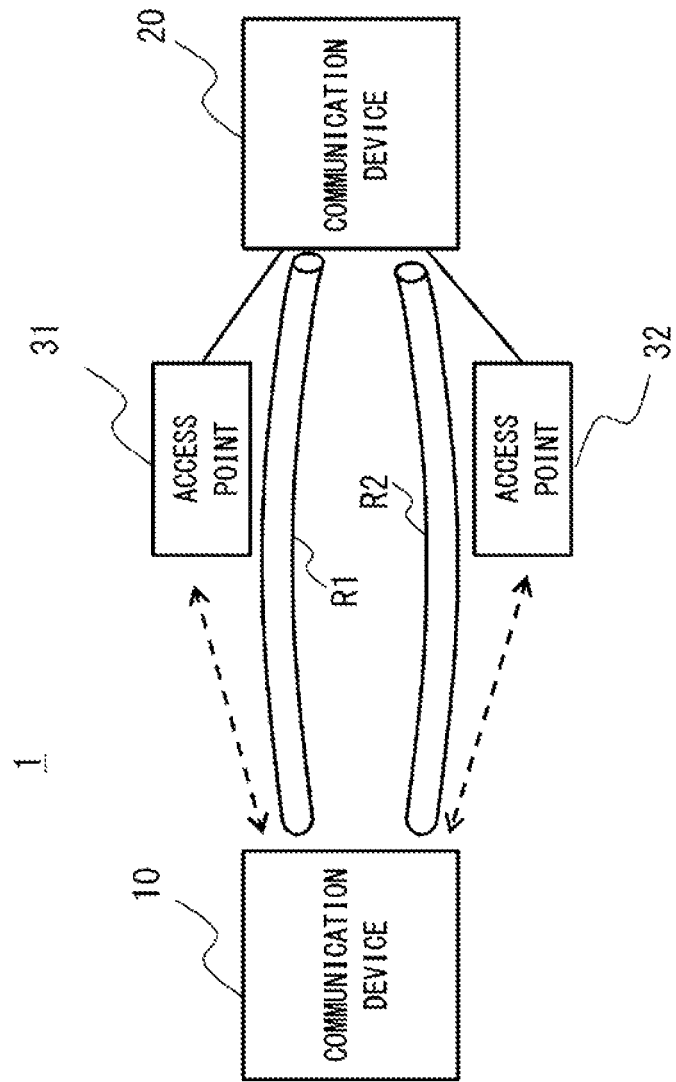
FIG. 1 is a block diagram showing an overview of a communication system according to an example embodiment.
Figure 2:
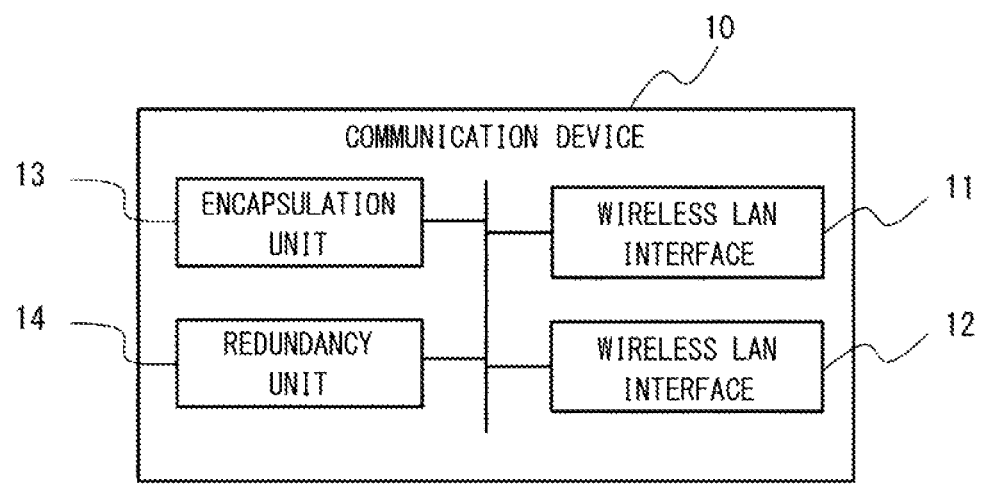
FIG. 2 is a block diagram showing an overview of a first communication device according to an example embodiment.
Figure 3:
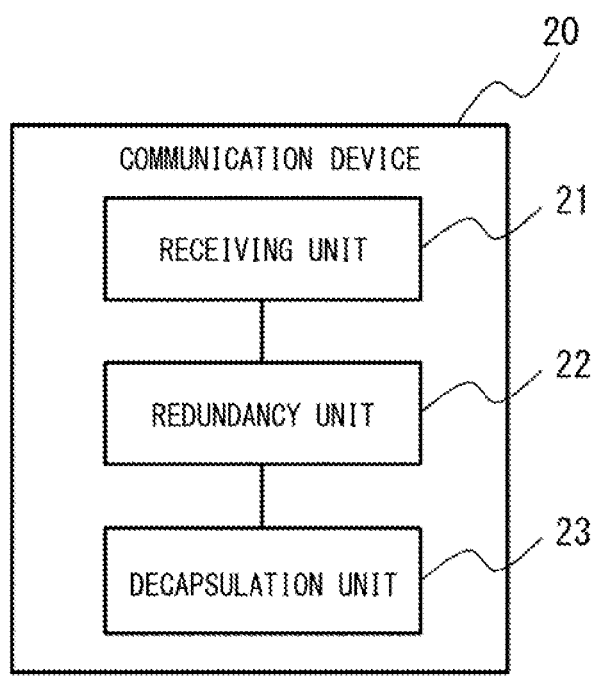
FIG. 3 is a block diagram showing an overview of a second communication device according to an example embodiment.

FIG. 1 shows an overall configuration of a communication system 1 according to an example embodiment, and FIGS. 2 and 3 show overall configurations of two communication devices that constitute the communication system 1.

As shown in FIG. 1, the communication system 1 according to the example embodiment includes a communication device (first communication device) 10, a communication device (second communication device) 20, an access point (first wireless LAN access point) 31, and an access point (second wireless LAN access point) 32. The access points 31 and 32 are connected by wire to the communication device 20, and wirelessly communicate with the communication device 10. The communication devices 10 and 20 achieve redundancy (doubling) of a communication path using a path R1 through the access point 31 and a path R2 through the access point 32.

As shown in FIG. 2, the communication device 10 includes wireless LAN interfaces 11 and 12, an encapsulation unit 13, and a redundancy unit 14. The wireless LAN interface (first wireless LAN interface) 11 wirelessly communicates with the access point 31. The wireless LAN interface (second wireless LAN interface) 12 wirelessly communicates with the access point 32.

The encapsulation unit 13 encapsulates, in accordance with a specified encapsulation protocol, a transmission frame to be transmitted to the communication device 20 via Layer 2 tunneling. The redundancy unit 14 generates a first encapsulated frame where the MAC address of the wireless LAN interface 11 is set to a sender MAC address and a second encapsulated frame where the MAC address of the wireless LAN interface 12 is set to the source MAC address by using the encapsulated transmission frame. Further, the wireless LAN interface 11 wirelessly transmits the generated first encapsulated frame to the access point 31 and the wireless LAN interface 12 wirelessly transmits the generated second encapsulated frame to the access point 32. The transmission frame is thereby transmitted through two paths: the path R1 and the path R2.

As shown in FIG. 3, the communication device 20 includes a receiving unit 21, a redundancy unit 22, and a decapsulation unit 23. The receiving unit 21 receives the first encapsulated frame from the communication device 10 through the access point 31 that is connected by wire, and receives the second encapsulated frame from the communication device 10 through the access point 32 that is connected by wire. The redundancy unit 22 selects one of the first encapsulated frame and the second encapsulated frame received by the receiving unit 21. For example, duplication of a packet is eliminated using a sequence number. The decapsulation unit 23 decapsulates the encapsulated frame selected by the redundancy unit 22.

As described above, in this example embodiment, when performing communication via Layer 2 tunneling between a communication device that performs wireless LAN communication and a communication device that is connected to access points, a frame is transmitted and received through redundant paths via two access points. Further, the transmitting side sets the MAC address of the wireless LAN interface that wirelessly communicates with the access point of each path to the source MAC address for the encapsulated frame, and transmits the set frame. This allows wireless communication through the access point to be done reliably and thereby enhances the reliability of communication including wireless communication.

First Example Embodiment

Figure 4:
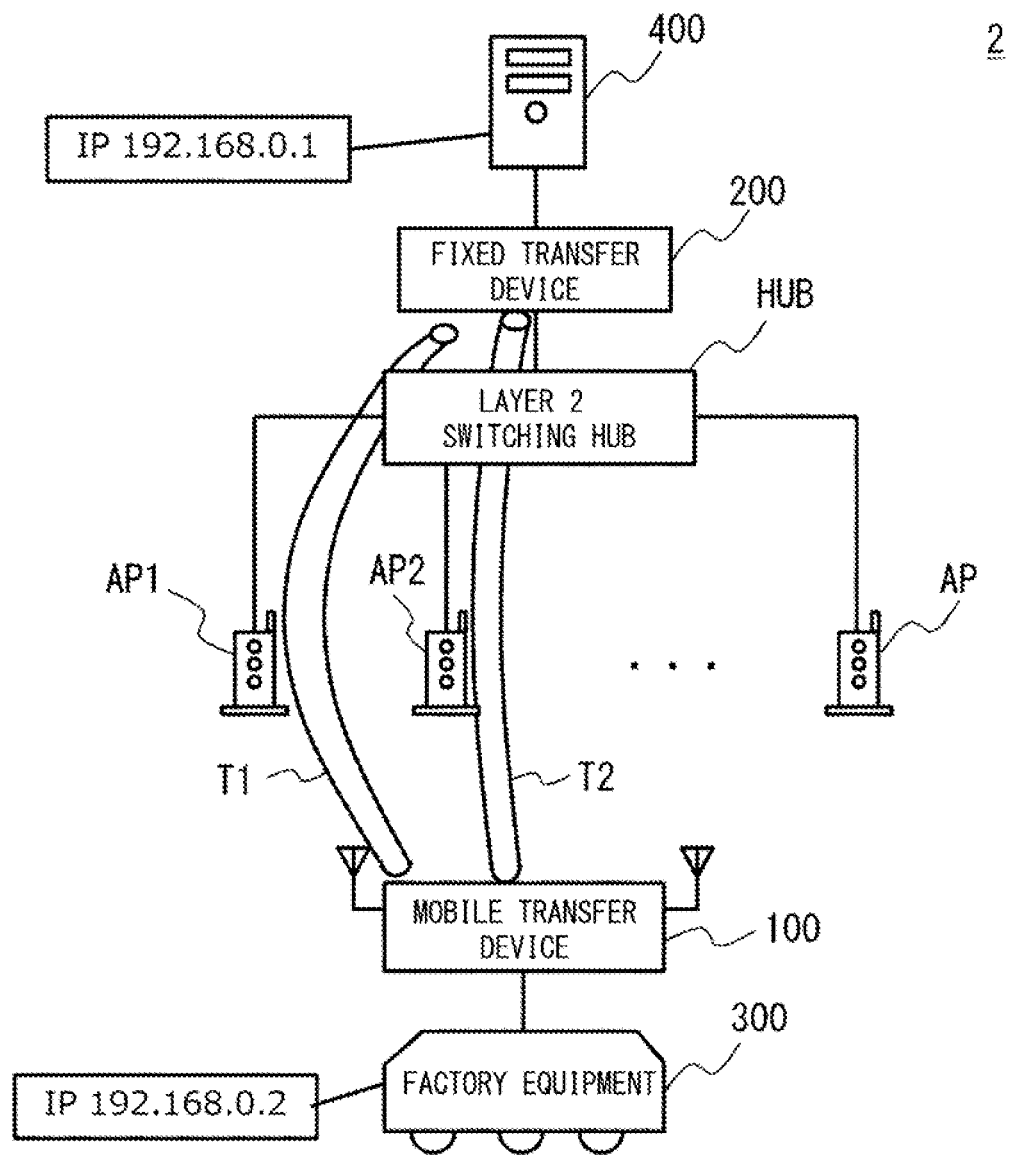
FIG. 4 is a block diagram showing a configuration example of a communication system according to a first example embodiment.

A first example embodiment is described hereinafter with reference to the drawings. FIG. 4 shows a configuration example of a communication system 2 according to this example embodiment.

The communication system 2 is a system that enables communication between factory equipment 300 and a management device 400. For example, the communication system 2 constructs a factory network in a factory having manufacturing facilities or the like. In a factory, equipment are often moved due to a change in manufacturing line or the like. If equipment are connected through a wired network (a wired LAN such as Ethernet (registered trademark), for example), it requires time and manpower to change wiring or the like when moving the equipment, and it is therefore desirable to reduce such time and manpower required. Further, mobile equipment such as an AGV (Automated Guided Vehicle) is placed in a factory, and a wired network cannot sufficiently support communication of such mobile equipment.

In view of the above circumstances, a part of the communication path between the factory equipment 300 and the management device 400 is provided by a wireless network using a wireless LAN in consideration of moving factory equipment. On the other hand, use of a wireless LAN may cause unstable communication quality compared with use of a wired LAN. Therefore, this example embodiment aims at enhancing the reliability of wireless LAN communication between the factory equipment 300 and the management device 400.

As shown in FIG. 4, in addition to the factory equipment 300 and the management device 400, the communication system 2 according to this example embodiment includes a mobile transfer device (first communication device) 100, a fixed transfer device (second communication device) 200, a plurality of access points AP, and a Layer 2 switching hub HUB between the factory equipment 300 and the management device 400.

The plurality of access points AP are placed at specified intervals in the factory, and transfer data in bridge mode, for example. Different BSSID (Basic Service Set Identifiers) are set respectively to the plurality of access points AP (including AP1 and AP2), and wireless communication with a desired access point is enabled by setting the BSSID of the access point to a wireless LAN frame. Further, each access point AP is capable of wireless communication using an arbitrary channel. For example, channels that do not interfere with each other, such as channels of 2.4 GHz and 5 GHz bands, may be used.

For example, the factory equipment 300 is an AGV (Automated Guided Vehicle) that automatically runs in a factory or a movable industrial robot, and the management device 400 is a management server that manages the driving or the like of the factory equipment 300. The factory equipment 300 transmits its location information or the like to the management device 400, and the management device 400 transmits direction information of movement or the like to the factory equipment 300. Note that the factory equipment 300 and the management device 400 may be other arbitrary devices.

The mobile transfer device 100 is a transfer device that transfers packets transmitted to and received by the factory equipment 300. The mobile transfer device 100 performs wireless communication with the plurality of access points AP, and performs encapsulation communication with the fixed transfer device 200 through the plurality of access points AP by using a plurality of paths (e.g., T1 and T2). The mobile transfer device 100 is placed to be movable together with the factory equipment 300, and is connected to the factory equipment 300 by wired LAN. The mobile transfer device 100 and the factory equipment 300 move in a factory and communicate with the fixed transfer device and the management device 400 through nearby (e.g., two) access points AP. Although the mobile transfer device 100 and the factory equipment 300 are separate devices in this example, the mobile transfer device 100 and the factory equipment 300 may be one device. Specifically, the mobile transfer device 100 may be built in the factory equipment 300.

The fixed transfer device 200 is a transfer device that transfers packets transmitted to and received by the management device 400. The fixed transfer device 200 is connected by wired LAN to the plurality of access points AP through the Layer 2 switching hub HUB. The fixed transfer device 200 performs wired communication with the plurality of access points AP, and performs encapsulation communication with the mobile transfer device 100 through the plurality of access points AP. Although the fixed transfer device 200 and the management device 400 are separate devices in this example, the fixed transfer device 200 and the management device 400 may be one device. Specifically, the fixed transfer device 200 may be built in the management device 400.

IP addresses of the same subnetwork are set for the management device 400 and the factory equipment 300. For example, "192.16.0.1" is set for the management device 400, and "192.16.0.2" is set for the factory equipment 300. This example embodiment enables wireless communication between the management device 400 and the factory equipment 300 without changing settings such as the IP addresses (subnetwork) of the management device 400 and the factory equipment 300 or applications. Specifically, by providing the configuration of the fixed transfer device 200 to the mobile transfer device 100 between the management device 400 and the factory equipment 300, communication by wireless LAN is possible without affecting the management device 400 and the factory equipment 300. To achieve this, in this example embodiment, GRE encapsulation communication (Layer 2 tunneling communication) is performed between the mobile transfer device 100 and the fixed transfer device 200, and further redundancy of the communication path is achieved with the path T1 and the path T2. Note that redundant paths may be any two or more paths. Further, another encapsulation protocol, not limited to GRE, may be used.

Figure 5:
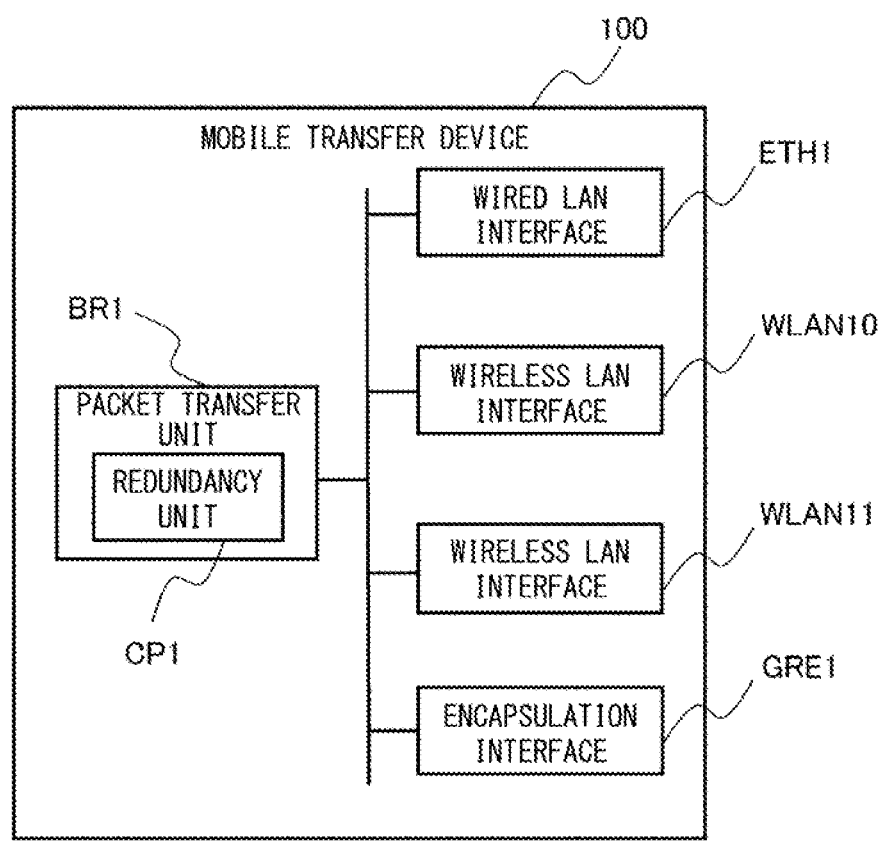
FIG. 5 is a block diagram showing a configuration example of a mobile transfer device according to the first example embodiment.

FIG. 5 shows a configuration example of the mobile transfer device 100 according to this example embodiment. As shown in FIG. 5, the mobile transfer device 100 includes a wired LAN interface ETH1, wireless LAN interfaces WLAN10 and WLAN11, an encapsulation interface GRE1, and a packet transfer unit BR1. Note that the number of wireless LAN interfaces is not limited to two. A plurality of wireless LAN interfaces may be included according to the number of redundant paths.

The wired LAN interface ETH1 is a wired communication unit that performs Ethernet communication. The wired LAN interface ETH1 is connected by wire to the factory equipment 300 and transmits and receives packets to and from the factory equipment 300.

The wireless LAN interfaces WLAN10 and WLAN11 are wireless communication units that perform wireless LAN communication, and wirelessly communicate with any of the access points AP. The wireless LAN interfaces WLAN10 and WLAN11 communicate with a desired access point AP by setting the BSSID of the access point AP to a wireless LAN frame. Note that, by associating (registering) the MAC address of a wireless LAN interface with an access point AP in advance, wireless communication can be carried out between the wireless LAN interface and the access point AP without discarding the wireless LAN frame.

The wireless LAN interfaces WLAN10 and WLAN11 also serve as redundant transmission units that transmit the same frame to redundant paths. In the wireless LAN interfaces WLAN10 and WLAN11, it is preferred that radio signals do not interfere with each other in the transmission of redundant frames (encapsulated frames). To avoid interference, channels that do not interfere with each other may be used. For example, the wireless LAN interface WLAN10 may wirelessly communicate with the access point AP1 by using the channel of 2.4 GHz band, and the wireless LAN interface WLAN11 may wirelessly communicate with the access point AP2 by using the channel of 5 GHz band, so that redundant frames are simultaneously transmitted.

Further, when using channels that interfere with each other, it is desirable to control transmission in such a way that the timing of transmission is different from each other. For example, ON/OFF of wireless transmission may be controlled in such a way that the wireless transmission period does not overlap between the wireless LAN interfaces WLAN10 and WLAN11.

The encapsulation interface GRE1 is an encapsulation communication unit (virtual interface) that performs GRE encapsulation communication. The encapsulation interface GRE1 performs encapsulation communication by establishing a GRE tunnel between the fixed transfer device 200 and the encapsulation interface GRE1. The encapsulation interface GRE1 encapsulates a frame containing a packet received from the factory equipment 300 and further decapsulates an encapsulated frame received from the access point AP.

The packet transfer unit BR1 is a transfer unit that transfers packets transmitted and received in each interface of the mobile transfer device 100. The packet transfer unit BR1 has a routing table or a MAC address table. The packet transfer unit BR1 refers to the routing table or the like, and transfers the packet to the interface corresponding to the destination address (e.g., IP address) of the packet (or frame). Further, the packet transfer unit BR1 includes a redundancy unit CP1 that transmits and receives the frame to and from the redundant paths (e.g., the path T1 and the path T2). The redundancy unit CP1 assigns a sequence number or copies the frame when transferring the packet received from the factory equipment 300 through the redundant paths. Further, when transferring frames received from the plurality of access points AP through the redundant paths to the factory equipment 300, the redundancy unit CP1 may sort the packets in the order of sequence numbers and discard a duplicate packet on the basis of the sequence number. Specifically, in this example embodiment, the same IP packets are transmitted through two paths, and one of those packets received earlier is processed.

Figure 6:
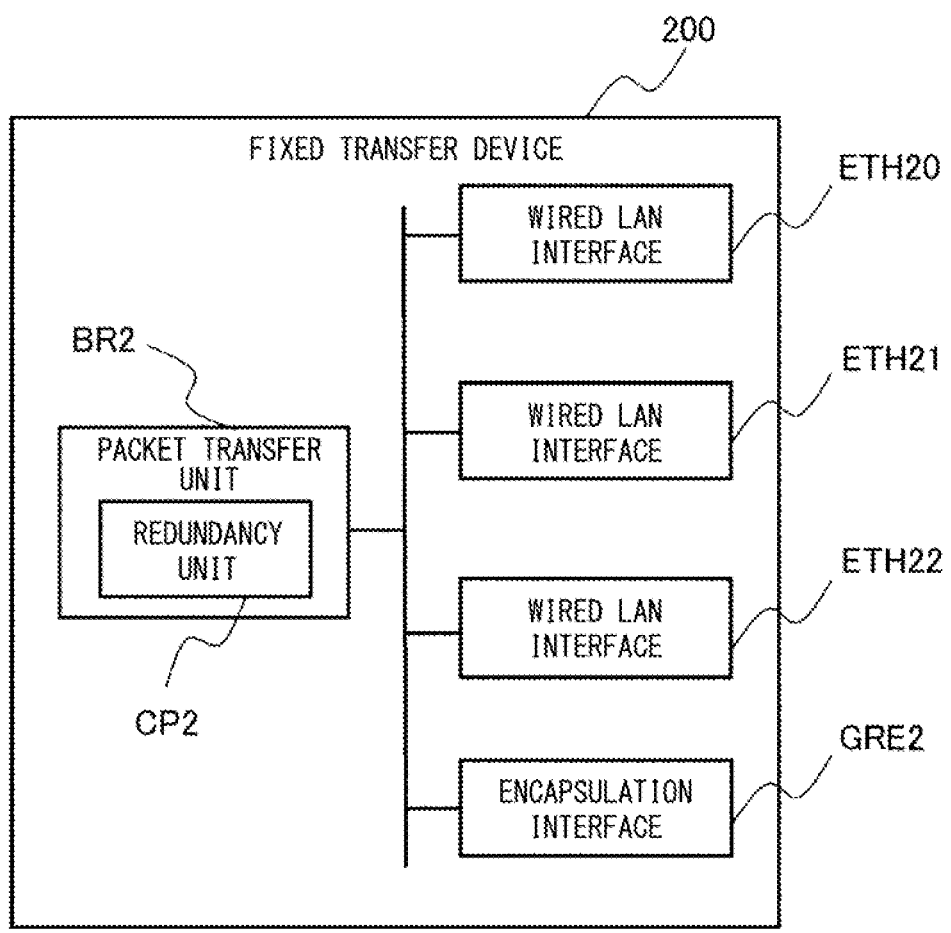
FIG. 6 is a block diagram showing a configuration example of a fixed transfer device according to the first example embodiment.

FIG. 6 shows a configuration example of the fixed transfer device 200 according to this example embodiment. As shown in FIG. 6, the fixed transfer device 200 includes wired LAN interfaces ETH20, ETH21 and ETH22, an encapsulation interface GRE2, and a packet transfer unit BR2. Note that a plurality of wired LAN interfaces may be included according to the number of redundant paths.

The wired LAN interfaces ETH20, ETH21 and ETH22 are wired communication units that perform Ethernet communication. The wired LAN interface ETH20 is connected by wire to the management device 400 and transmits and receives packets to and from the management device 400.

The wired LAN interfaces ETH21 and ETH22 are connected by wire to the Layer 2 switching hub HUB. For example, the wired LAN interface ETH21 transmits and receives frames to and from the mobile transfer device 100 through the Layer 2 switching hub HUB and the access point AP1. Further, the wired LAN interface ETH22 transmits and receives frames to and from the mobile transfer device 100 through the Layer 2 switching hub HUB and the access point AP2. Although different IP addresses are set to the wired LAN interfaces ETH21 and ETH22, IP addresses may be shared so that any of the IP addresses can be received by an arbitrary interface.

The encapsulation interface GRE2 is an encapsulation communication unit (virtual interface) that performs GRE encapsulation communication. The encapsulation interface GRE2 performs encapsulation communication by establishing a GRE tunnel between the mobile transfer device 100 and the encapsulation interface GRE2. The encapsulation interface GRE2 encapsulates a frame containing a packet received from the management device 400 and further decapsulates an encapsulated frame received from the access point AP.

The packet transfer unit BR2 is a transfer unit that transfers packets transmitted and received in each interface of the fixed transfer device 200. The packet transfer unit BR2 has the same function as the packet transfer unit BR1 of the mobile transfer device 100, and includes a redundancy unit CP2. The packet transfer unit BR2 refers to the routing table or the like, and transfers the packet to the interface corresponding to the destination address of the packet (or frame). The redundancy unit CP2 assigns a sequence number or copies the frame when transferring the packet received from the management device 400 through the redundant paths. Further, when transferring frames received from the plurality of access points AP through the redundant paths to the management device 400, the redundancy unit CP2 may sort the packets in the order of sequence numbers and discard a duplicate packet on the basis of the sequence number.

Figure 7:
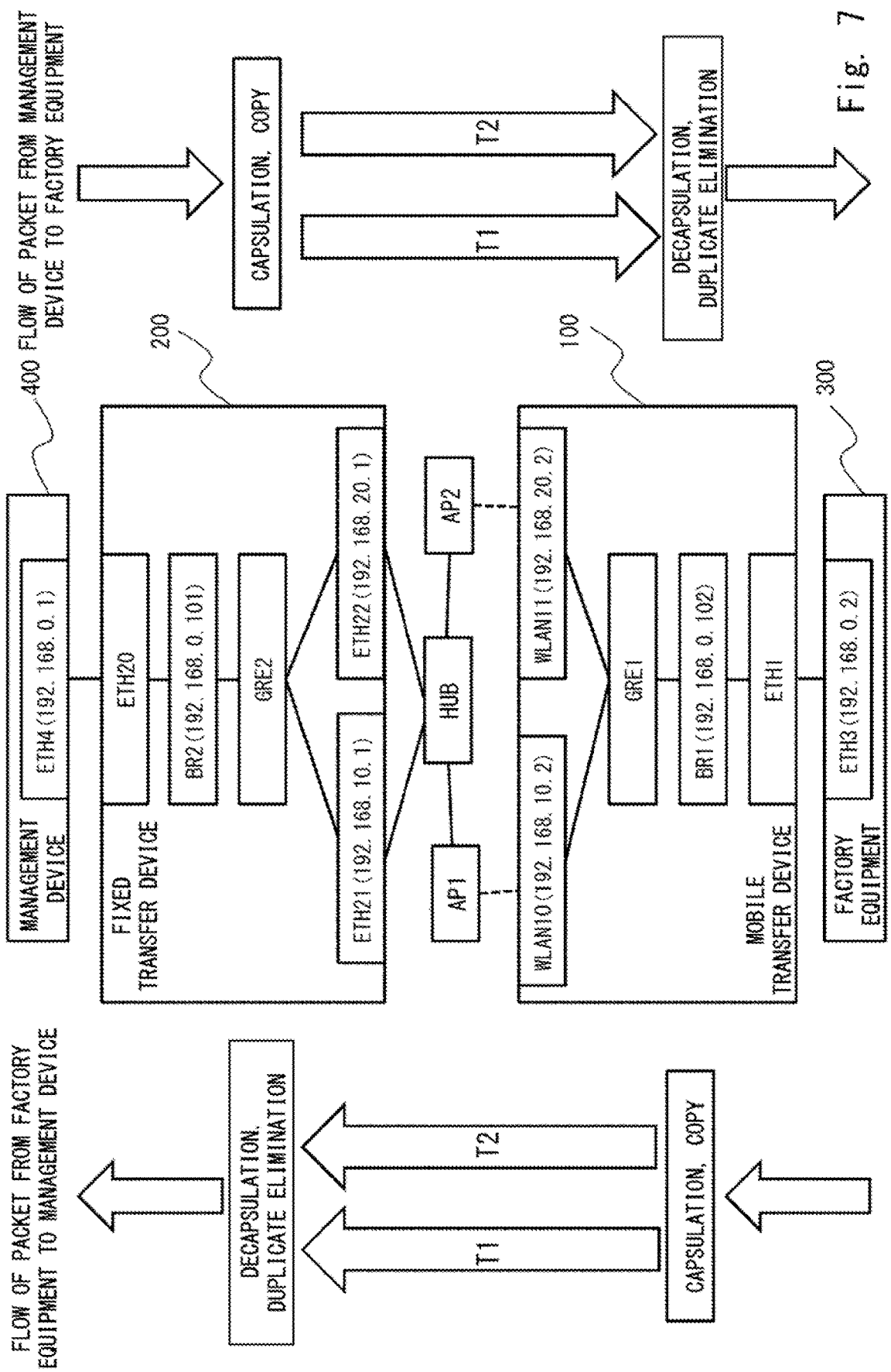
FIG. 7 is a block diagram showing a network configuration example of a communication system according to the first example embodiment.

FIG. 7 shows a network configuration example of the communication system according to the first example embodiment and an image of the flow of packets (frames). As illustrated in FIG. 4, IP addresses of the same subnetwork are set for the management device 400 and the factory equipment 300. In this example, "192.16.0.1" is set for a wired LAN interface ETH4 of the management device 400, and "192.16.0.2" is set for a wired LAN interface ETH3 of the factory equipment 300.

Further, IP addresses of the same subnetwork as that of the management device 400 and the factory equipment 300 are set for the fixed transfer device 200 on the side of the management device 400 and for the mobile transfer device 100 on the side of the factory equipment 300. For example, "192.168.101" is set for the packet transfer unit BR2 of the fixed transfer device 200, and "192.168.0.102" is set for the packet transfer unit BR1 of the mobile transfer device 100.

On the other hand, IP addresses of a different subnetwork from that of the management device 400 and the factory equipment 300 are set for the fixed transfer device 200 and the mobile transfer device 100 on the wireless LAN side. Further, an IP address of a different subnetwork is set for each communication path to be made redundant. Specifically, in the fixed transfer device 200 and the mobile transfer device 100, subnetworks are different between a path through the access point AP1 and a path through the access point AP2. For example, "192.168.10.1" is set for the wired LAN interface ETH21 of the fixed transfer device 200, and "192.168.10.2" is set for the wireless LAN interface WLAN10 of the mobile transfer device 100. Further, "192.168.20.1" is set for the wired LAN interface ETH22 of the fixed transfer device 200, and "192.168.20.2" is set for the wireless LAN interface WLAN11 of the mobile transfer device 100.

When transmitting a packet from the factory equipment 300 to the management device 400, for example, the factory equipment 300 transmits the packet from "192.168.0.2" to "192.168.0.1".

The mobile transfer device 100 receives a packet by the wired LAN interface ETH1, and the packet transfer unit BR1 transfers the received packet to "192.168.0.1". At this time, the encapsulation interface GRE1 encapsulates by GRE a frame containing the packet, and the redundancy unit CP1 copies the encapsulated frame.

The two copied encapsulated frames are transmitted respectively from the wireless LAN interfaces WLAN10 and WLAN11 through the access point AP1 and the access point AP2. Specifically, the encapsulated frame is transmitted from "192.168.10.2" of the wireless LAN interface WLAN10 to "192.168.10.1" of the wired LAN interface ETH21 of the management device 400, and the encapsulated frame is transmitted from "192.168.20.2" of the wireless LAN interface WLAN11 to "192.168.20.1" of the wired LAN interface ETH22 of the management device 400.

The fixed transfer device 200 receives the encapsulated frames by the wired LAN interfaces ETH21 and ETH22, and then the encapsulation interface GRE2 decapsulates the received encapsulated frames, and the redundancy unit CP2 discards a duplicate packet. Since the packet contained in the decapsulated frame is the packet addressed to "192.168.0.1" from "192.168.0.2" transmitted by the factory equipment 300, it is transmitted by the packet transfer unit BR2 from the wired LAN interface ETH20 to the management device 400.

On the other hand, when transmitting a packet from the management device 400 to the factory equipment 300, the management device 400 transmits the packet from "192.168.0.1" to "192.168.0.2.

The fixed transfer device 200 receives a packet by the wired LAN interface ETH20, and then the packet transfer unit BR2 transfers the received packet to "192.168.0.2". At this time, the encapsulation interface GRE2 encapsulates by GRE a frame containing the packet, and the redundancy unit CP2 copies the encapsulated frame.

The two copied encapsulated frames are transmitted respectively from the wired LAN interfaces ETH21 and ETH22 through the access point AP1 and the access point AP2. Specifically, the encapsulated frame is transmitted from "192.168.10.1" of the wired LAN interface ETH21 to "192.168.10.2" of the wireless LAN interface WLAN10 of the mobile transfer device 100, and the encapsulated frame is transmitted from "192.168.20.1" of the wired LAN interface ETH22 to "192.168.20.2" of the wireless LAN interface WLAN11 of the mobile transfer device 100.

The mobile transfer device 100 receives the encapsulated frames by the wireless LAN interfaces WLAN10 and WLAN11, and then the encapsulation interface GRE1 decapsulates the received encapsulated frames, and the redundancy unit CP1 discards a duplicate packet. Since the packet contained in the decapsulated frame is the packet addressed to "192.168.0.2" from "192.168.0.1" transmitted by the management device 400, it is transmitted by the packet transfer unit BR1 from the wired LAN interface ETH1 to the factory equipment 300.

Figure 8:
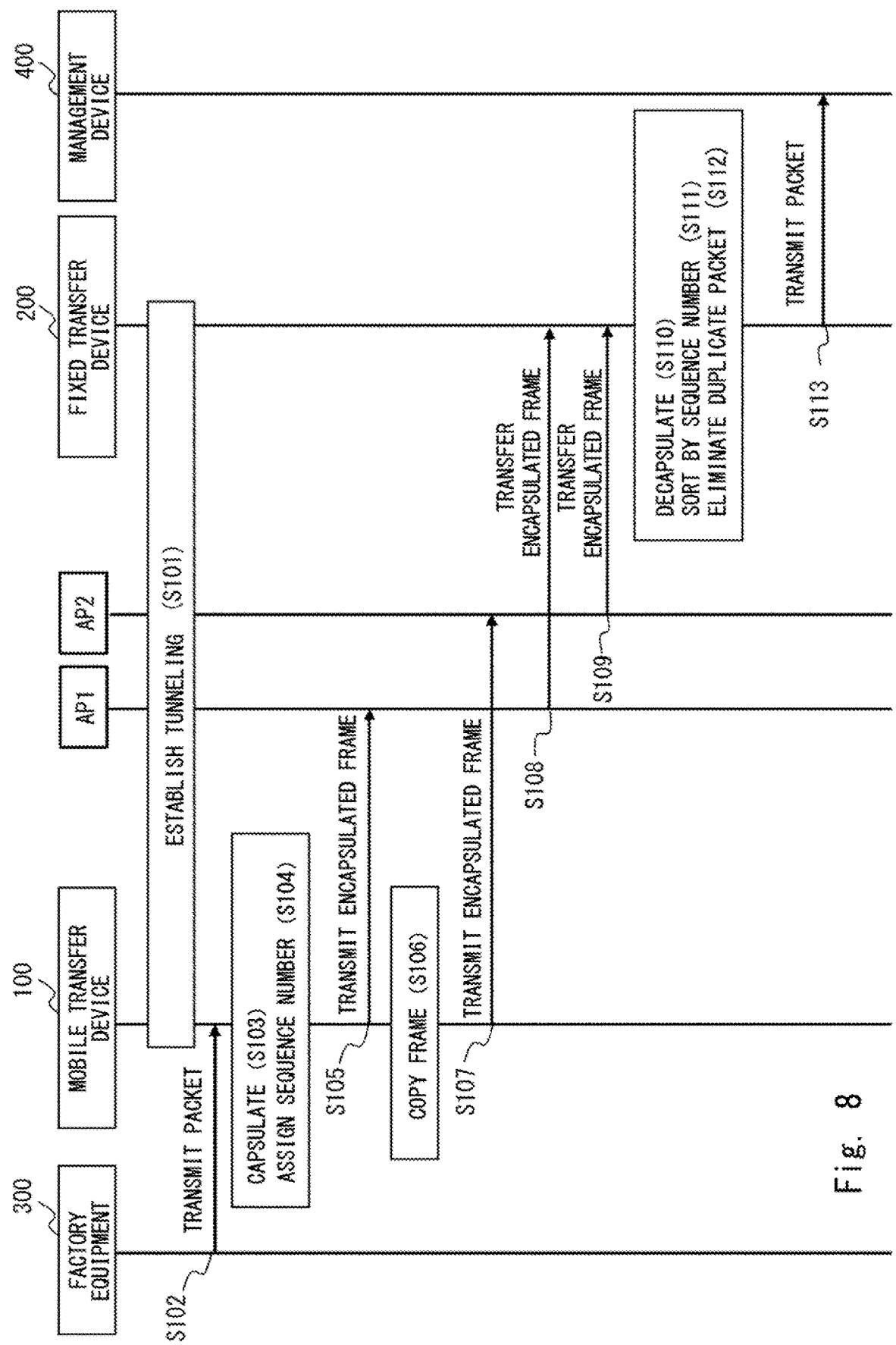
FIG. 8 is a sequence chart showing an operation example of the communication system according to the first example embodiment.
Figure 9:
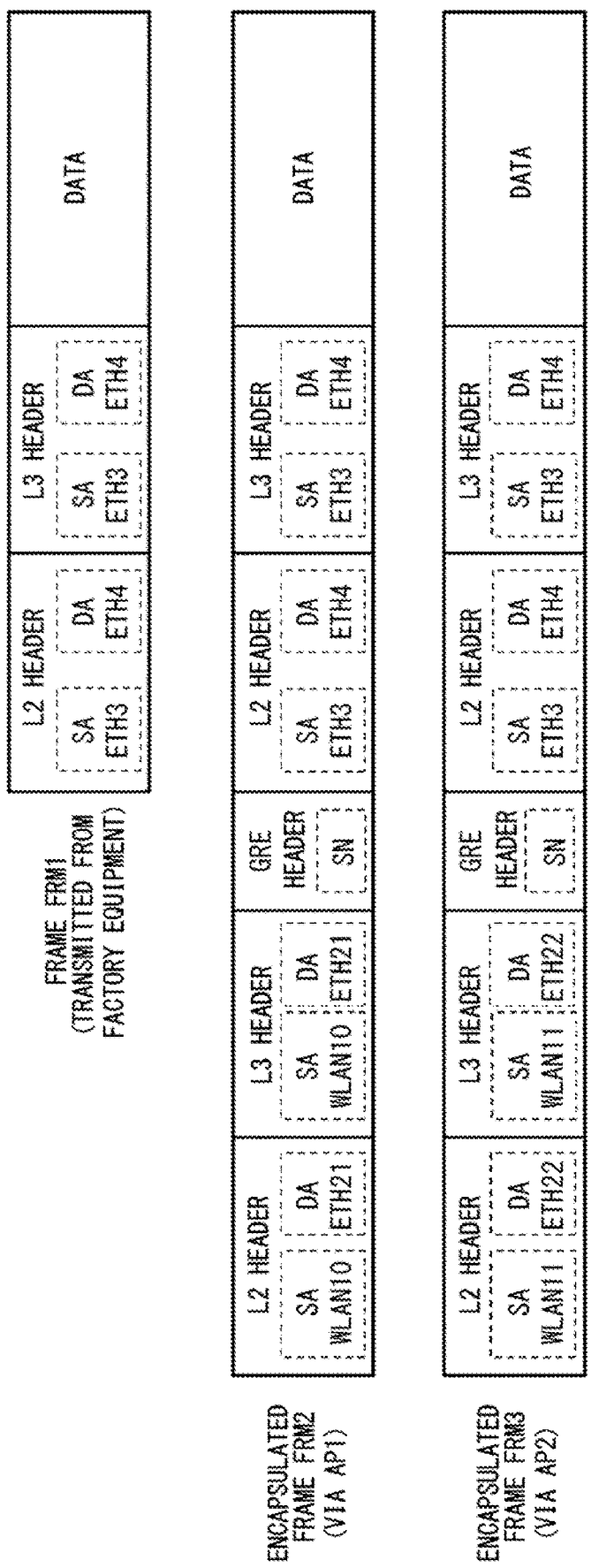
FIG. 9 is a view showing a format example of a frame used in the communication system according to the first example embodiment.

FIG. 8 is a sequence chart of transmitting a packet from the factory equipment 300 to the management device 400, and FIG. 9 shows an example of frame formats in this case.

As shown in FIG. 8, the mobile transfer device 100 establishes tunneling between the fixed transfer device 200 and the mobile transfer device 100 in advance (S101). In this example, the mobile transfer device 100 establishes Layer 2 tunneling (encapsulates a Layer 2 frame) in accordance with the GRE protocol. This enables the mobile transfer device 100 to perform encapsulation communication between the encapsulation interface GRE1 and the fixed transfer device 200.

Next, the factory equipment 300 transmits a packet addressed to the management device 400 (S102). The frame FRM1 in FIG. 9 is an example of a frame that contains a packet transmitted from the factory equipment 300. The packet contained in FRM1 is a TCP/IP packet, for example. In this example embodiment, an application and a change in settings are not needed in the factory equipment 300 and the management device 400, and transmission and reception of a typical TCP/IP packet are possible.

As shown in FIG. 9, the frame FRM1 contains a Layer 2 header (MAC header), a Layer 3 header (IP header), and transmission data. The factory equipment 300 sets the MAC address of the wired LAN interface ETH3 of the factory equipment 300 to a source MAC address SA of the Layer 2 header of the frame FRM1, and sets the MAC address of the wired LAN interface ETH4 of the management device 400 (or the MAC address of the mobile transfer device 100) to a destination MAC address DA. Further, the factory equipment 300 sets the IP address of the wired LAN interface ETH4 of the factory equipment 300 to the source IP address SA of the Layer 3 header of the frame FRM1, and sets the IP address of the wired LAN interface ETH4 of the management device 400 to the destination IP address DA.

Then, the mobile transfer device 100 receives the packet from the factory equipment 300, and encapsulates by GRE the frame containing the packet (S103), and assigns (includes) a sequence number to the encapsulated frame (S104). The frame FRM2 in FIG. 9 is an example of the encapsulated frame generated at this time. As shown in FIG. 9, the mobile transfer device 100 generates the frame FRM2 by adding a Layer 2 header, a Layer 3 header, and a GRE header to the frame FRM1 received from the factory equipment 300, and assigns a sequence number to the GRE header. Since the encapsulated frame FRM2 is a frame to be transmitted through the access point AP', the mobile transfer device 100 sets the MAC address of the wireless LAN interface WLAN10 to the source MAC address SA of the Layer 2 header of the frame FRM2, and sets the MAC address of the wired LAN interface ETH21 of the fixed transfer device 200 to the destination MAC address DA.

Use of a MAC address that is not associated with the access point AP1 may cause the frame to be discarded at the access point AP1. Thus, by setting the MAC address of the wireless LAN interface WLAN10 that is already associated with the access point AP', communication through the access point AP1 is reliably carried out.

Further, the IP address of the wireless LAN interface WLAN10 is set to the source IP address SA of the Layer 3 header of the frame FRM2, and the IP address of the wired LAN interface ETH21 of the fixed transfer device 200 is set to the destination IP address DA. Note that, if it is receivable by the wired LAN interface ETH21 of the fixed transfer device 200, the IP address of the wired LAN interface ETH22 may be set.

Then, the mobile transfer device 100 transmits the generated frame FRM2 to the access point AP1 (S105). At this time, the wireless LAN interface WLAN10 transmits the encapsulated frame FRM2 after converting it into a wireless LAN format. To be specific, it generates a wireless LAN frame where the BSSID of the access point AP1 is further added to the Layer 2 header of the frame FRM2.

After that, the mobile transfer device 100 copies the encapsulated frame (S106). The frame FRM3 in FIG. 9 is an example of the encapsulated frame generated at this time. As shown in FIG. 9, the mobile transfer device 100 copies the frame FRM2 and generates the frame FRM3. Since the encapsulated frame FRM3 is a frame to be transmitted through the access point AP2, the mobile transfer device 100 sets the MAC address of the wireless LAN interface WLAN11 to the source MAC address SA of the Layer 2 header of the frame FRM3, and sets the MAC address of the wired LAN interface ETH22 of the fixed transfer device 200 to the destination MAC address DA. Communication through the access point AP2 is thereby reliably carried out, as in the case of the frame FRM2.

Further, the IP address of the wireless LAN interface WLAN11 is set to the source IP address SA of the Layer 3 header of the frame FRM3, and the IP address of the wired LAN interface ETH22 of the fixed transfer device 200 is set to the destination IP address DA. If it is receivable by the wired LAN interface ETH22 of the fixed transfer device 200, the IP address of the wired LAN interface ETH21 may be set as in the case of the frame FRM2.

Then, the mobile transfer device 100 transmits the generated frame FRM3 to the access point AP2 (S107). At this time, the wireless LAN interface WLAN11 transmits the encapsulated frame FRM3 after converts it into a wireless LAN format. To be specific, it generates a wireless LAN frame where the BSSID of the access point AP2 is further added to the Layer 2 header of the frame FRM3.

After that, the access point AP1 transfers, to the fixed transfer device 200, the frame (the wireless LAN frame of FRM2) received from the mobile transfer device 100 (S108). The access point AP1 transmits the received wireless LAN frame after converting it into the format of the frame FRM2 in FIG. 9. To be specific, it removes the BSSID of the access point AP1 from the Layer 2 header of the wireless LAN frame and thereby generates the frame FRM2.

Further, the access point AP2 transfers, to the fixed transfer device 200, the frame (the wireless LAN frame of FRM3) received from the mobile transfer device 100 (S109). The access point AP2 transmits the received wireless LAN frame after converting it into the format of the frame FRM3 in FIG. 9. To be specific, it removes the BSSID of the access point AP2 from the Layer 2 header of the wireless LAN frame and thereby generates the frame FRM3.

The fixed transfer device 200 receives the encapsulated frames from the access points AP1 and AP2, and performs decapsulation (S110), sorting by sequence number (S111), and elimination of a duplicate packet (S112). When the fixed transfer device 200 receives the encapsulated frame FRM2 from the access point AP1, it removes the Layer 2 header and the GRE header from the encapsulated frame FRM2, and thereby generates the frame FRM1 in FIG. 9. Likewise, when the fixed transfer device 200 receives the encapsulated frame FRM3 from the access point AP2, it removes the Layer 2 header and the GRE header from the encapsulated frame FRM3, and thereby generates the frame FRM1 in FIG. 9. At this time, the received packets (frames) are sorted according to the order of the sequence numbers contained in the GRE headers, and if there is a packet with the same sequence number, this packet is discarded.

Further, the fixed transfer device 200 transmits the packet to the management device 400 (S113). Since the packet contained in the decapsulated frame is addressed to the management device 400, the fixed transfer device 200 transmits this packet to the management device 400.

Figure 10:
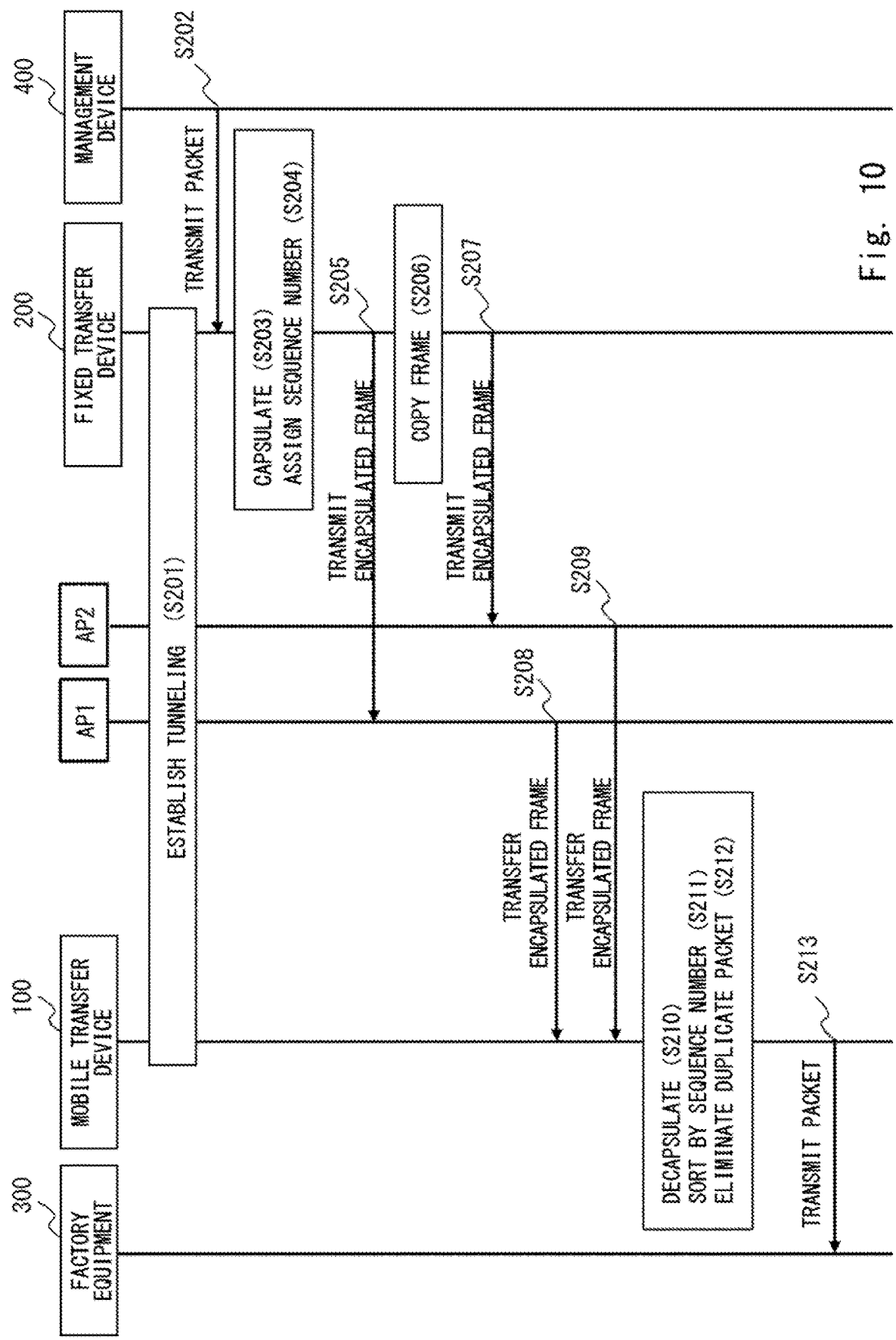
FIG. 10 is a sequence chart showing an operation example of the communication system according to the first example embodiment.
Figure 11:
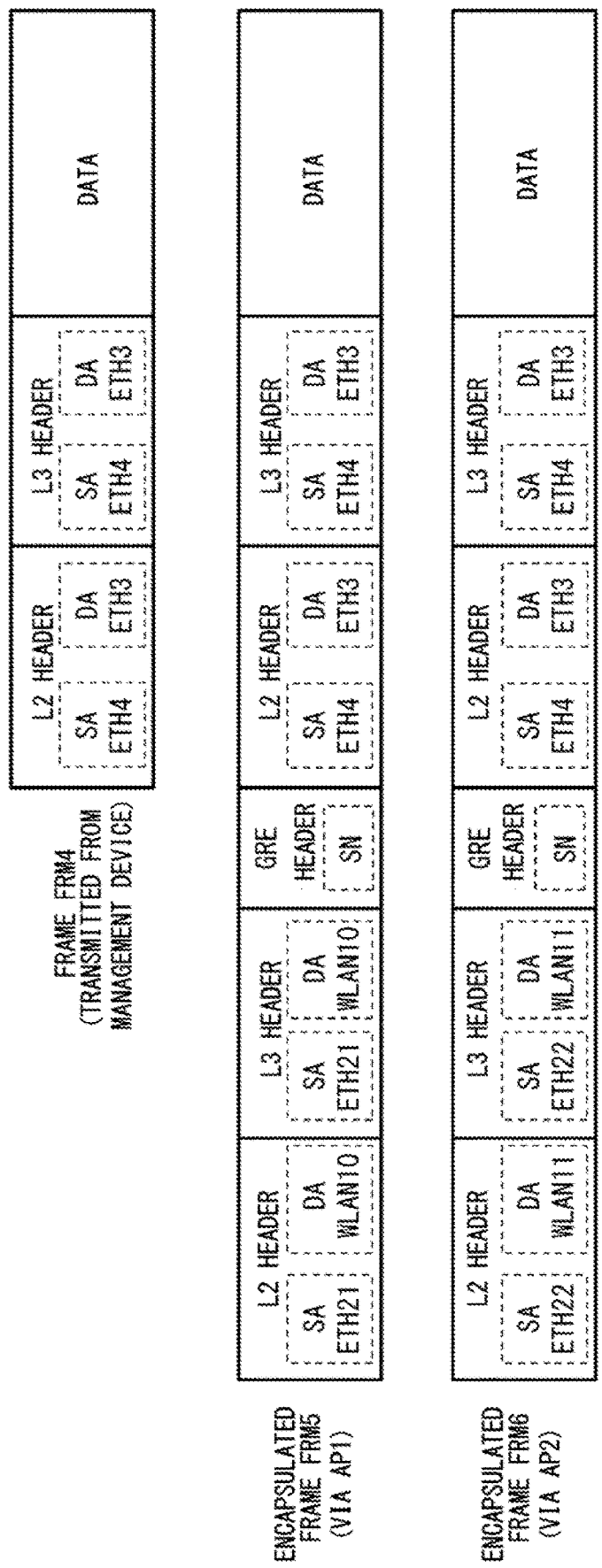
FIG. 11 is a view showing a format example of a frame used in the communication system according to the first example embodiment.

FIG. 10 is a sequence chart of transmitting a packet from the management device 400 to the factory equipment 300, and FIG. 11 shows an example of frame formats in this case.

As shown in FIG. 10, the fixed transfer device 200 establishes tunneling between the mobile transfer device 100 and the fixed transfer device 200 (S201) in the same manner as shown in FIG. 8. Next, the management device 400 transmits a packet addressed to the factory equipment 300 (S202). The frame FRM4 in FIG. 11 is an example of a frame that contains a packet transmitted from the management device 400, and it has the same format as the frame FRM1 in FIG. 9. The management device 400 sets the MAC address of the wired LAN interface ETH4 of the management device 400 to the source MAC address SA of the Layer 2 header of the frame FRM4, and sets the MAC address of the wired LAN interface ETH3 of the factory equipment 300 to the destination MAC address DA. Further, the management device 400 sets the IP address of the wired LAN interface ETH4 of the management device 400 to the source IP address SA of the Layer 3 header of the frame FRM4, and sets the IP address of the wired LAN interface ETH3 of the factory equipment 300 to the destination IP address DA.

Then, the fixed transfer device 200 receives the packet from the management device 400, and encapsulates the frame by GRE (S203), and assigns (includes) a sequence number to the encapsulated frame (S204) in the same manner as shown in FIG. 8. The frame FRM5 in FIG. 11 is an example of the encapsulated frame generated at this time, and it has the same format as the frame FRM2 in FIG. 9. The fixed transfer device 200 sets the MAC address of the wired LAN interface ETH21 of the fixed transfer device 200 to the source MAC address SA of the Layer 2 header of the frame FRM5, and sets the MAC address of the wireless LAN interface WLAN10 to the destination MAC address DA. Further, the fixed transfer device 200 sets the IP address of the wired LAN interface ETH21 of the fixed transfer device 200 to the source IP address SA of the Layer 3 header of the frame FRM5, and sets the IP address of the wireless LAN interface WLAN10 to the destination IP address DA.

Then, the fixed transfer device 200 transmits the generated frame FRM5 to the access point AP1 (S205), and copies the encapsulated frame (S206). The frame FRM6 in FIG. 11 is an example of the encapsulated frame generated at this time, and it has the same format as the frame FRM3 in FIG. 9. The fixed transfer device 200 sets the MAC address of the wired LAN interface ETH22 of the fixed transfer device 200 to the source MAC address SA of the Layer 2 header of the frame FRM6, and sets the MAC address of the wireless LAN interface WLAN11 to the destination MAC address DA. Further, the fixed transfer device 200 sets the IP address of the wired LAN interface ETH22 of the fixed transfer device 200 to the source IP address SA of the Layer 3 header of the frame FRM6, and sets the IP address of the wireless LAN interface WLAN11 to the destination IP address DA. Further, the fixed transfer device 200 transmits the generated frame FRM6 to the access point AP2 (S207).

After that, the access point AP1 transfers, to the mobile transfer device 100, the frame (FRM5) received from the fixed transfer device 200 (S208). At this time, the access point AP1 transmits the encapsulated frame FRM5 after converting it into a wireless LAN format. To be specific, it generates a wireless LAN frame where the BSSID of the access point AP1 is further added to the Layer 2 header of the frame FRM5.

Further, the access point AP2 transfers, to the mobile transfer device 100, the frame (FRM6) received from the fixed transfer device 200 (S209). At this time, the access point AP2 transmits the encapsulated frame FRM6 after converting it into a wireless LAN format. To be specific, it generates a wireless LAN frame where the BSSID of the access point AP2 is further added to the Layer 2 header of the frame FRM6.

The mobile transfer device 100 receives the wireless LAN frames from the access points AP1 and AP2, and performs decapsulation (S210), sorting by sequence number (S211), and elimination of a duplicate packet (S212). When the mobile transfer device 100 receives the wireless LAN frame from the access point AP1, it converts this frame into the format of the frame FRM5 in FIG. 11. To be specific, it removes the BSSID of the access point AP1 from the Layer 2 header of the wireless LAN frame and thereby generates the frame FRM5. Further, it eliminates the Layer 2 header and the GRE header from the encapsulated frame FRM5, and thereby generates the frame FRM4 in FIG. 11.

Likewise, when the mobile transfer device 100 receives the wireless LAN frame from the access point AP2, it removes the BSSID from the Layer 2 header of the wireless LAN frame and thereby generates the frame FRM6, and further eliminates the Layer 2 header and the GRE header and thereby generates the frame FRM4 in FIG. 11. At this time, the mobile transfer device 100 sorts the packets according to the sequence numbers contained in the GRE headers, and discards a duplicate packet in the same manner as shown in FIG. 9.

Further, the mobile transfer device 100 transmits the packet to the factory equipment 300 (S213). Since the packet contained in the decapsulated frame is addressed to the factory equipment 300, the mobile transfer device 100 transmits this packet to the factory equipment 300.

As described above, in this example embodiment, a plurality of wireless LAN paths are prepared to achieve redundancy in a communication system of a factory or the like, and the transmitting side transmits frames to both of the paths, and the receiving side processes the frame that arrives earlier. Further, the receiving side performs sequence control. This enhances the reliability of wireless LAN communication where communication of a frame is unstable.

Further, in this example embodiment, encapsulation communication such as GRE is used to achieve wireless communication without need of an application or a change in settings of existing equipment. Further, this allows use of typical TCP/IP communication or UDP/IP communication between existing equipment, and avoids the Duplicate ACK problem or the duplicate reception problem by sequence control or duplicate packet elimination.

Further, when transmitting a frame from a wireless LAN interface, the MAC address of the wireless LAN interface is set to the source MAC address, so that the frame is not discarded at the access point and communication is done reliably through the access point. Specifically, in this example embodiment, information of the whole Layer 2 frame containing original Layer 2 to Layer 4 headers is left, and further two copies of this information are prepared, and Layer 2 headers are set to enable communication of the two copied frames to different wireless LAN access points, and then the frames are transmitted by Layer 3 routing.

Other Example Embodiments

Although redundancy communication (generation of a plurality of frames) is always performed using a plurality of paths in the above-described example embodiment, determination whether to perform redundancy communication may be made. For example, redundancy communication may be performed according to the priority of a frame to be transmitted. To be specific, redundancy transmission may be performed when the priority of a frame is higher than a predetermined criterion by referring to information (input interface information, MAC header information, IP header information, and TCP header) about Layers 1 to 4 of packets. This may be achieved by setting a mark according to the priority to the frame at specified timing.

Further, redundancy communication may be performed according to the wireless communication quality of a wireless LAN. For example, the radio field intensity or communication errors may be monitored for each wireless LAN interface, and redundancy transmission may be performed when the wireless communication quality of any wireless LAN interface is lower than a predetermined criterion.

Each element in the above-described example embodiment may be formed by hardware or software or both of them, and may be formed by one hardware or software or a plurality of hardware or software. The function (processing) of each device may be implemented by a computer including a CPU, a memory and the like. For example, a control program for performing a communication method according to the example embodiment may be stored in a storage device, and each function may be implemented by executing the program stored in the storage device on the CPU.

The above-described program can be stored and provided to a computer using any type of non-transitory computer readable medium. Non-transitory computer readable media include any type of tangible storage medium. Examples of the non-transitory computer readable media include magnetic storage media (such as flexible disks, magnetic tapes, hard disk drives, etc.), and optical magnetic storage media (e.g. magneto-optical disks), CD-ROM (Read Only Memory), CD-R, and CD-R/W, semiconductor memories (e.g., mask ROM, PROM (Programmable ROM), EPROM (Erasable PROM), flash ROM, and RAM (Random Access Memory)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line.

Note that the present disclosure is not limited to the above-described example embodiments and can be modified as appropriate without departing from the spirit and scope of the present disclosure.

Although the present disclosure is described above with reference to the example embodiment, the present disclosure is not limited to the above-described example embodiment. Various changes and modifications as would be obvious to one skilled in the art may be made to the structure and the details of the present disclosure without departing from the scope of the disclosure.

The whole or part of the example embodiments disclosed above can be described as, but not limited to, the following supplementary notes.

(Supplementary Note 1)

A communication device comprising:
a first wireless LAN interface configured to wirelessly communicate with a first wireless LAN access point;
a second wireless LAN interface configured to wirelessly communicate with a second wireless LAN access point;
an encapsulation means for encapsulating, in accordance with a specified encapsulation protocol, a transmission frame to be transmitted to a communication device at other side via Layer 2 tunneling; and
a redundancy means for generating a first encapsulated frame where a MAC address of the first wireless LAN interface is set to a source MAC address and a second encapsulated frame where a MAC address of the second wireless LAN interface is set to a source MAC address by using the encapsulated transmission frame, wherein
the first wireless LAN interface wirelessly transmits the generated first encapsulated frame to the first wireless LAN access point, and the second wireless LAN interface wirelessly transmits the generated second encapsulated frame to the second wireless LAN access point.

(Supplementary Note 2)

The communication device according to Supplementary Note 1, wherein the redundancy means sets, to a destination MAC address of the first encapsulated frame, a MAC address of a wired LAN interface of the communication device at other side to which the first wireless LAN access point is connected, and sets, to a destination MAC address of the second encapsulated frame, a MAC address of a wired LAN interface of the communication device at other side to which the second wireless LAN access point is connected.

(Supplementary Note 3)

The communication device according to Supplementary Note 1 or 2, wherein the redundancy means sets, to a destination IP address of the first encapsulated frame, an IP address of a wired LAN interface of the communication device at other side to which the first or second wireless LAN access point is connected, and sets, to a destination IP address of the second encapsulated frame, an IP address of a wired LAN interface of the communication device at other side to which the first or second wireless LAN access point is connected.

(Supplementary Note 4)

The communication device according to any one of Supplementary Notes 1 to 3, wherein the encapsulation means assigns a sequence number to an encapsulation header when it is encapsulating the transmission frame.

(Supplementary Note 5)

The communication device according to any one of Supplementary Notes 1 to 4, wherein the redundancy means generates the first and second encapsulated frames according to a priority of the transmission frame.

(Supplementary Note 6)

The communication device according to any one of Supplementary Notes 1 to 5, wherein the redundancy means generates the first and second encapsulated frames according to quality of wireless communication with the first wireless LAN access point or quality of wireless communication with the second wireless LAN access point.

(Supplementary Note 7)

The communication device according to any one of Supplementary Notes 1 to 6, wherein a wireless channel to be used or wireless transmission timing of the first wireless LAN interface differs from that of the second wireless LAN interface.

(Supplementary Note 8)

A communication system comprising:
first and second communication devices; and
first and second wireless LAN access points connected to the second communication device,
wherein the first communication device includes:
a first wireless LAN interface configured to wirelessly communicate with the first wireless LAN access point;
a second wireless LAN interface configured to wirelessly communicate with the second wireless LAN access point;
an encapsulation means for encapsulating, in accordance with a specified encapsulation protocol, a transmission frame to be transmitted to the second communication device via Layer 2 tunneling; and
a redundancy means for generating a first encapsulated frame where a MAC address of the first wireless LAN interface is set to a source MAC address and a second encapsulated frame where a MAC address of the second wireless LAN interface is set to a source MAC address by using the encapsulated transmission frame,
the first wireless LAN interface wirelessly transmits the generated first encapsulated frame to the first wireless LAN access point, and
the second wireless LAN interface wirelessly transmits the generated second encapsulated frame to the second wireless LAN access point.

(Supplementary Note 9)

The communication system according to Supplementary Note 8, wherein the redundancy means sets, to a destination MAC address of the first encapsulated frame, a MAC address of a wired LAN interface of the communication device at other side to which the first wireless LAN access point is connected, and sets, to a destination MAC address of the second encapsulated frame, a MAC address of a wired LAN interface of the communication device at other side to which the second wireless LAN access point is connected.

(Supplementary Note 10)

A communication method comprising:
encapsulating, in accordance with a specified encapsulation protocol, a transmission frame to be transmitted to a communication device at other side via Layer 2 tunneling;
generating a first encapsulated frame where a MAC address of a first wireless LAN interface is set to a source MAC address and a second encapsulated frame where a MAC address of a second wireless LAN interface is set to a source MAC address by using the encapsulated transmission frame, the first wireless LAN interface being configured to wirelessly communicate with a first wireless LAN access point, and the second wireless LAN interface being configured to wirelessly communicate with a second wireless LAN access point;
wirelessly transmitting the generated first encapsulated frame from the first wireless LAN interface to the first wireless LAN access point; and
wirelessly transmitting the generated second encapsulated frame from the second wireless LAN interface to the second wireless LAN access point.

(Supplementary Note 11)

The communication method according to Supplementary Note 10, wherein a MAC address of a wired LAN interface of the communication device at other side to which the first wireless LAN access point is connected is set to a destination MAC address of the first encapsulated frame, and a MAC address of a wired LAN interface of the communication device at other side to which the second wireless LAN access point is connected is set to a destination MAC address of the second encapsulated frame.

(Supplementary Note 12)

A communication program causing a computer to execute a process comprising:

encapsulating, in accordance with a specified encapsulation protocol, a transmission frame to be transmitted to a communication device at other side via Layer 2 tunneling;

generating a first encapsulated frame where a MAC address of a first wireless LAN interface is set to a source MAC address and a second encapsulated frame where a MAC address of a second wireless LAN interface is set to a source MAC address by using the encapsulated transmission frame, the first wireless LAN interface being configured to wirelessly communicate with a first wireless LAN access point, and the second wireless LAN interface being configured to wirelessly communicate with a second wireless LAN access point;

wirelessly transmitting the generated first encapsulated frame from the first wireless LAN interface to the first wireless LAN access point; and wirelessly transmitting the generated second encapsulated frame from the second wireless LAN interface to the second wireless LAN access point.

(Supplementary Note 13)

The communication program according to Supplementary Note 12, wherein a MAC address of a wired LAN interface of the communication device at other side to which the first wireless LAN access point is connected is set to a destination MAC address of the first encapsulated frame, and a MAC address of a wired LAN interface of the communication device at other side to which the second wireless LAN access point is connected is set to a destination MAC address of the second encapsulated frame.

(Supplementary Note 14)

A communication device comprising:

a receiving means for receiving a first encapsulated frame from a communication device at other side through a first wireless LAN access point connected by wire and receiving a second encapsulated frame from the communication device at other side through a second wireless LAN access point connected by wire;

a redundancy means for selecting any one of the first encapsulated frame and the second encapsulated frame; and a decapsulation means for decapsulating the selected encapsulated frame in accordance with a specified encapsulation protocol.

REFERENCE SIGNS LIST 1, 2 COMMUNICATION SYSTEM
10 COMMUNICATION DEVICE
11, 12 WIRELESS LAN INTERFACE
13 ENCAPSULATION UNIT
14 REDUNDANCY UNIT
20 COMMUNICATION DEVICE
21 RECEIVING UNIT
22 REDUNDANCY UNIT
23 DECAPSULATION UNIT
31, 32 ACCESS POINT
100 MOBILE TRANSFER DEVICE
200 FIXED TRANSFER DEVICE
300 FACTORY EQUIPMENT
400 MANAGEMENT DEVICE
AP, AP1, AP2 ACCESS POINT
BR1, BR2 PACKET TRANSFER UNIT
CP1, CP2 REDUNDANCY UNIT
ETH1 WIRED LAN INTERFACE
ETH20, ETH21, ETH22 WIRED LAN INTERFACE
ETH3, ETH4 WIRED LAN INTERFACE
GRE1, GRE2 ENCAPSULATION INTERFACE
HUB LAYER 2 SWITCHING HUB
WLAN10, WLAN11 WIRELESS LAN INTERFACE

What is claimed is:

1. A first communication device comprising:
a first wireless LAN interface configured to wirelessly communicate with a first wireless LAN access point;
a second wireless LAN interface configured to wirelessly communicate with a second wireless LAN access point;
a processor; and
memory storing instructions that, when executed by the processor, cause the first communication device to:
encapsulate, in accordance with a specified encapsulation protocol, a transmission frame to be transmitted to a second communication device via Layer 2 tunneling; and
generate a first encapsulated frame where a MAC address of the first wireless LAN interface is set to a first source MAC address and a second encapsulated frame where a MAC address of the second wireless LAN interface is set to a second source MAC address by using the encapsulated transmission frame, wherein
the first wireless LAN interface wirelessly transmits the generated first encapsulated frame to the first wireless LAN access point, and
the second wireless LAN interface wirelessly transmits the generated second encapsulated frame to the second wireless LAN access point.

2. The first communication device according to claim 1, wherein the processor is configured to execute the instructions to cause the first communication device to:
set, to a destination MAC address of the first encapsulated frame, a MAC address of a wired LAN interface of the second communication device to which the first wireless LAN access point is connected; and
set, to a destination MAC address of the second encapsulated frame, a MAC address of a wired LAN interface of the second communication device to which the second wireless LAN access point is connected.

3. The first communication device according to claim 1, wherein the processor is configured to execute the instructions to cause the first communication device to:
set, to a destination IP address of the first encapsulated frame, an IP address of a wired LAN interface of the second communication device to which the first or second wireless LAN access point is connected; and
set, to a destination IP address of the second encapsulated frame, an IP address of a wired LAN interface of the second communication device to which the first or second wireless LAN access point is connected.

4. The first communication device according to claim 1, wherein the processor is configured to execute the instructions to cause the first communication device to assign a sequence number to an encapsulation header when encapsulating the transmission frame.

5. The first communication device according to claim 1, wherein the processor is configured to execute the instructions to cause the first communication device to generate the first and second encapsulated frames according to a priority of the transmission frame.

6. The first communication device according to claim 1, wherein the processor is configured to execute the instructions to cause the first communication device to generate the first and second encapsulated frames according to quality of wireless communication with the first wireless LAN access point or quality of wireless communication with the second wireless LAN access point.

7. The first communication device according to claim 1, wherein a wireless channel to be used or wireless transmission timing of the first wireless LAN interface differs from that of the second wireless LAN interface.

8. A communication system comprising:
first and second communication devices; and
first and second wireless LAN access points connected to the second communication device,
wherein the first communication device comprises: a first wireless LAN interface configured to wirelessly communicate with the first wireless LAN access point;
a second wireless LAN interface configured to wirelessly communicate with the second wireless LAN access point;
a processor; and
memory storing instructions that, when executed by the processor, cause the first communication device to:
encapsulate, in accordance with a specified encapsulation protocol, a transmission frame to be transmitted to the second communication device via Layer 2 tunneling; and
generate a first encapsulated frame where a MAC address of the first wireless LAN interface is set to a first source MAC address and a second encapsulated frame where a MAC address of the second wireless LAN interface is set to a second source MAC address by using the encapsulated transmission frame,
wherein the first wireless LAN interface wirelessly transmits the generated first encapsulated frame to the first wireless LAN access point, and
wherein the second wireless LAN interface wirelessly transmits the generated second encapsulated frame to the second wireless LAN access point.

9. The communication system according to claim 8, wherein the processor is configured to execute the instructions to cause the first communication device to:
set, to a destination MAC address of the first encapsulated frame, a MAC address of a wired LAN interface of the second communication device to which the first wireless LAN access point is connected; and
set, to a destination MAC address of the second encapsulated frame, a MAC address of a wired LAN interface of the second communication device to which the second wireless LAN access point is connected.

10. A communication method performed by a first communication device, the communication method comprising:
encapsulating, in accordance with a specified encapsulation protocol, a transmission frame to be transmitted to a second communication device via Layer 2 tunneling;
generating a first encapsulated frame where a MAC address of a first wireless LAN interface is set to a first source MAC address and a second encapsulated frame where a MAC address of a second wireless LAN interface is set to a second source MAC address by using the encapsulated transmission frame, the first wireless LAN interface being configured to wirelessly communicate with a first wireless LAN access point, and the second wireless LAN interface being configured to wirelessly communicate with a second wireless LAN access point;
wirelessly transmitting the generated first encapsulated frame from the first wireless LAN interface to the first wireless LAN access point; and
wirelessly transmitting the generated second encapsulated frame from the second wireless LAN interface to the second wireless LAN access point.

11. The communication method according to claim 10, wherein a MAC address of a wired LAN interface of the second communication device to which the first wireless LAN access point is connected is set to a destination MAC address of the first encapsulated frame, and a MAC address of a wired LAN interface of the second communication device to which the second wireless LAN access point is connected is set to a destination MAC address of the second encapsulated frame.

12. A non-transitory computer readable medium storing a communication program causing a computer to execute a process comprising:
encapsulating, in accordance with a specified encapsulation protocol, a transmission frame to be transmitted to a second communication device via Layer 2 tunneling;
generating a first encapsulated frame where a MAC address of a first wireless LAN interface is set to a first source MAC address and a second encapsulated frame where a MAC address of a second wireless LAN interface is set to a second source MAC address by using the encapsulated transmission frame, the first wireless LAN interface being configured to wirelessly communicate with a first wireless LAN access point, and the second wireless LAN interface being configured to wirelessly communicate with a second wireless LAN access point;
wirelessly transmitting the generated first encapsulated frame from the first wireless LAN interface to the first wireless LAN access point; and
wirelessly transmitting the generated second encapsulated frame from the second wireless LAN interface to the second wireless LAN access point.

13. The non-transitory computer readable medium according to claim 12, wherein a MAC address of a wired LAN interface of the second communication device to which the first wireless LAN access point is connected is set to a destination MAC address of the first encapsulated frame, and a MAC address of a wired LAN interface of the second communication device to which the second wireless LAN access point is connected is set to a destination MAC address of the second encapsulated frame.

* * * * *